United States Patent [19]

Simmons et al.

[11] Patent Number: 5,111,983
[45] Date of Patent: May 12, 1992

[54] CAMERA STABILIZING DEVICE

[76] Inventors: Elex M. Simmons, 3429 Gimli Dr., Amelia, Ohio 45102; William E. Houser, 3856 Round Bottom Rd., Cincinnati, Ohio 45244

[21] Appl. No.: 23,842

[22] Filed: Mar. 9, 1987

Related U.S. Application Data

[63] Continuation of Ser. No. 828,139, Feb. 10, 1986, abandoned.

[51] Int. Cl.⁵ ............................................. A45F 3/14
[52] U.S. Cl. ................................. 224/258; 224/908; 248/118
[58] Field of Search ............... 224/258, 908; 269/328; 248/118; 42/94; 128/87 R

[56] References Cited

U.S. PATENT DOCUMENTS

| 46.365 | 2/1865 | Kinman | 248/118 |
| 2,969,899 | 1/1961 | Brooks | 224/252 X |
| 3,390,477 | 7/1968 | Galbraith | 248/118 |

*Primary Examiner*—Linda J. Sholl
*Attorney, Agent, or Firm*—Jeffrey V. Bamber

[57] ABSTRACT

A device for stabilizing a hand-held motion picture or videotape camera having a member for supporting the photographer's arm and a curved support at its lower end, which rests upon the photographer's thigh. The device is secured around the photographer's body by an adjustable strap. A U-shaped armrest is provided to hold the photographer's elbow in position on top of the member. In its preferred form, an adjustable clip may be attached to the lower part of the member to engage the belt of the photographer for additional stability.

3 Claims, 1 Drawing Sheet

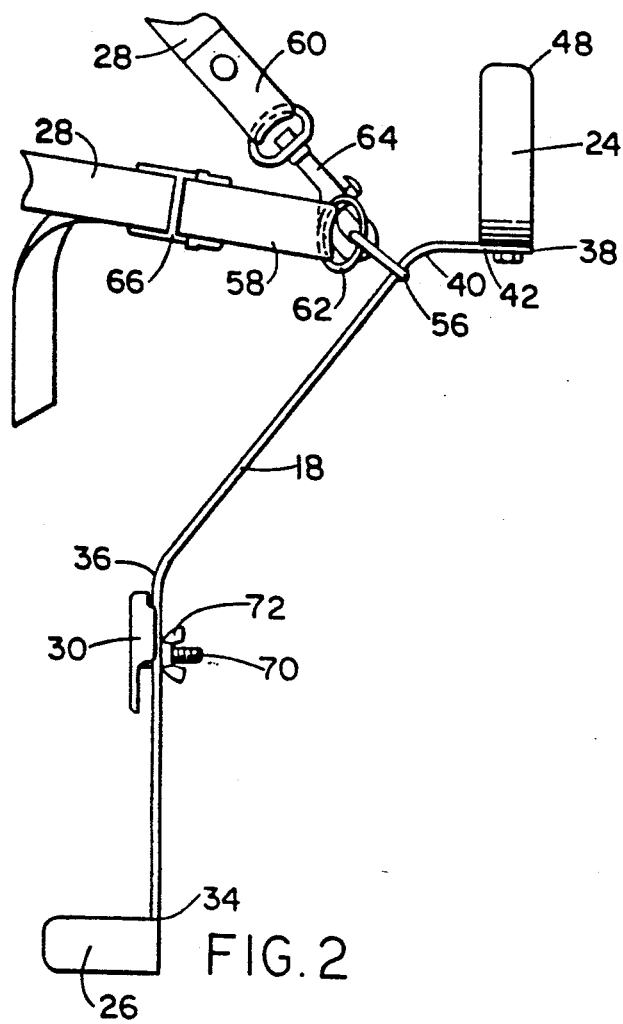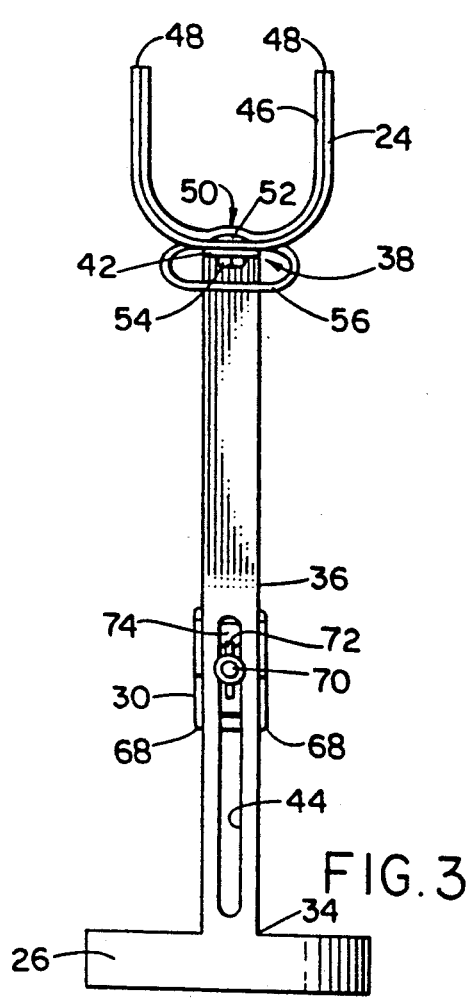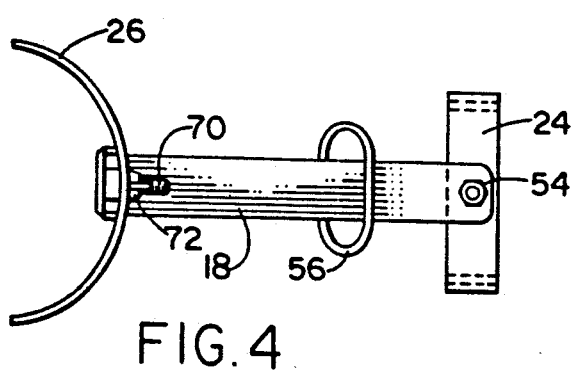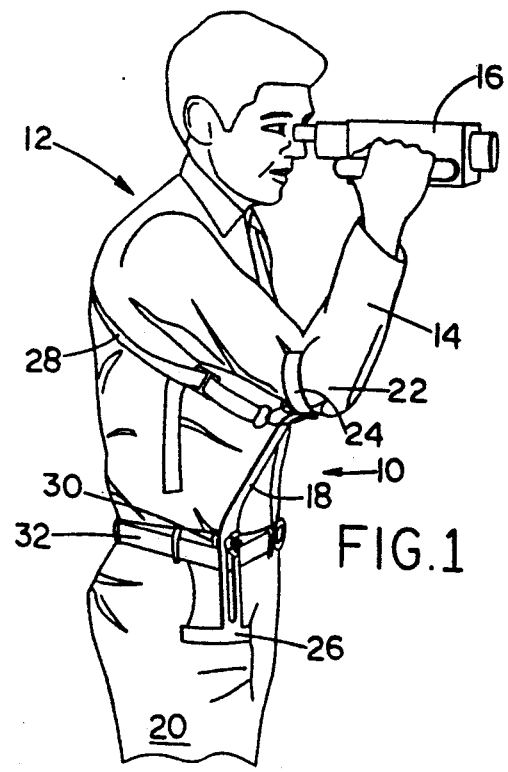

CAMERA STABILIZING DEVICE

This is a continuation of application Ser. No. 828,139, filed Feb. 10, 1986 now abandoned.

BACKGROUND OF THE INVENTION

1. Field of the Invention

The present invention relates generally to stabilizing equipment for cameras, and more particularly, is concerned with a camera stabilizing device which supports and steadies the arm of the photographer in which the camera is held.

2. Description of the Prior Art

Photographers, professional and amateur alike, who use motion picture and videotape cameras to photograph news and sporting events often encounter difficulties in obtaining a picture with a steady image. Certain types of these events, because of the mobility of the subject matter, are not well-suited for the use of a tripod, yet require some type of device which will enable the cameraman to hold the camera steady and allow him or her to photograph for a relatively long period of time without suffering fatigue from holding the camera.

Shoulder harnesses of various types of have been used to carry and hold steady television and other types of heavier, large cameras. The shoulder-mounted harnesses, are rarely suited for more light-weight, hand-held cameras such as home movie cameras and videotape cameras. Television camera supporting harnesses are also cumbersome and difficult to use when in crowds and places of difficult access.

Other types of devices have been devised to steady cameras ordinarily used for taking still pictures. Several of these devices employ a vertical rod of some type to hold the camera at eye level, which is held at the bottom by a part of the device which is fastened to the belt around the operator's waist, and is held a fixed distance away from the operator's body by a strap of some type. These suffer the drawbacks that they are difficult to use when photographing events which are constantly in motion, and a person wearing such a device would find it impossible to move immediately if, as in a football or soccer game, the action comes toward the photographer.

Consequently, a need exists for a camera holding device for hand-held cameras such as motion picture and videotape cameras which adequately overcomes the deficiencies of the prior attempts to satisfy this need.

SUMMARY OF THE INVENTION

With the above background in mind, it is an object of the present invention to provide a device for steadying hand-held cameras such as motion picture and videotape cameras which overcomes the above-mentioned drawbacks of known prior-art devices.

Specifically, it is a primary object of the present invention to provide a camera support which when used, would result in a picture as steady as that taken by a camera mounted on a tripod, yet is highly mobile, and can be used in crowds and other places difficult of access.

It is a further object of this invention to provide a camera support which minimizes operator fatigue by supporting the arm of the photographer instead of the camera, and which thereby allows the operator to retain control of the camera in his or her hand, to maximize control and enable the operator to avoid damage to the camera in the event the subject matter of the photography comes toward the operator.

These as well as other objects which will become apparent as the description proceeds, are fulfilled by the provision of the inventive camera stabilizing device characterized by a member for supporting the arm of the person holding the camera the lower end of which engages the thigh of the photographer, and a strap connected to the member for holding the device in a stationary position when the photographer places his or her elbow on top of the member. In its preferred form, an armrest is attached to the upper end of the member to hold the photographer's arm in position on top of the member and a thigh support is attached to the lower end of the member for stabilizing the device relative to the photographer's body. The lower half of the member may be essentially vertical, and the upper half bent away from the photographer at the midpoint of the member so a clip adjustably mounted on the lower half may be used to attach the device to the photographer's belt for additional stability.

BRIEF DESCRIPTION OF THE DRAWINGS

The invention itself will be better understood, and additional advantages and features of the invention will become apparent from the following detailed description of the preferred embodiment of the invention, taken in conjunction with the accompanying drawings, in which:

FIG. 1 is a right side elevational perspective view showing a person using the camera stabilizing device of the present invention to steady a video camera while photographing his subject;

FIG. 2 is a side elevational view of the camera stabilizing device of the present invention with the ends of the strap which passes around the body of the photographer shown in detail;

FIG. 3 is a front view of FIG. 2 illustrating the device without the adjustable strap as it would be seen by one standing in front of the photographer; and, FIG. 4 is a bottom plan view of the camera stabilizing device shown in FIG. 2.

DETAILED DESCRIPTION OF THE INVENTION

Referring now to the drawings and more particularly, to FIG. 1, there is shown a camera stabilizing device, generally designated 10, which comprises the preferred embodiment of the present invention. As seen in FIG. 1, a person 12 is utilizing the device 10 to stabilize his arm 14 while photographing his subject with a videotape camera 16. The camera stabilizing device 10 includes a member 18 which extends from a position where it engages the upper portion of the photographer's thigh 20 to the photographer's elbow 22 where it supports the arm 14 of the photographer. An armrest 24 is attached to the upper end of the member 18 for holding the arm 14 of the photographer in place on top of the member 18. The lower end of the member is held in place relative to the body of the photographer 12 by a thigh support 26, which engages the upper portion of the photographer's thigh 20. A strap 28, both ends of which are attached near the upper end of the member 18, passes around the body of the photographer and holds the device 10 a fixed distance away from the photographer's body when the photographer's elbow 22 is placed on the armrest 24. The camera stabilizing device 10 of the present invention, when in its preferred embodiment, is further held steady relative to the body of the photographer 12 by a means for engaging the belt of the person using the device, such as belt clip 30 attached to the member 18, which engages the belt 32 of the photographer 12.

As shown in FIG. 2, the member 18 of this embodiment of the invention is a flat metal bar bent in several places. From the bottom end 34 of the member 18, to a point slightly below the midpoint 36 of the member 18, the member 18 is straight, and when in operative position, is essentially vertical. At the midpoint 36, the member 18 is bent at an angle away from the body of the photographer 12 (not shown in FIG. 2) so that the upper end of the member 38 reaches the end of the photographer's elbow 22 when the photographer 12 holds the viewfinder of a camera 16 up to his eye. Near the upper end 38 of the member 18 is another bend 40, at an angle away from the photographer 12 such that upper end 38 of the member 18 forms platform 42 which is approximately horizontal, upon which the photographer's elbow 22 may rest. As seen in the FIG. 3, lower half of the member contains a long vertical slot 44 which runs from a point slightly above the bottom end of the member 34 to a point slightly below the midpoint 36 of the member 18. The slot 44 is made wide enough to pass a bolt through, and its purpose is to provide a means for adjusting the belt clip 30 upward and downward to enable the device 10 to be used by persons of different heights and sizes.

As also seen in this view, affixed to the upper end 38 of the member 18 is a U-shaped armrest 24 wide enough to fit around the elbow of most persons who use the device. The armrest 24 is made from a soft and flexible material such as Lexan, so a person's arm may rest upon it without discomfort. Foam padding 46 surrounds the inside of the armrest 24 shown in FIG. 3 for added comfort. To prevent injury to the photographer when placing his elbow in the armrest 24, the ends 48 of the armrest 24 may be rounded. At the center 50 of the flat portion of the bottom of the armrest 24, a hole is drilled through which a bolt 52 may be passed to connect the armrest 24 to the member 18. The armrest 24 is held in place relative to the member 18 by a hex nut 54, inside of which is a star-washer (not shown), which allows for some freedom of movement of the armrest 24 relative to the member 18 when the device 10 is in use.

Referring back to FIG. 2, located slightly below the bend at the upper end of the member 40, is an oval ring 56 formed from a piece of steel rod. One of the long sides of the oval ring 56 is welded to the member 18. The oval ring 56 provides a means by which both ends 58 and 60 of the strap 28, which when in preferred form, is adjustable, can be attached to the member 18. One end 58 of the strap 28 is permanently held to the ring 56 by an interlocking oval ring 62. The other end 60 of the strap 28 is held in place on the oval ring 56 by a snap hook 64 which enables the person using the device to more easily put the device on and remove the device prior to and after use. The adjustable strap 28 could be made of a wide variety of materials, but is best suited for use with the present invention when made of Nylon. The strap 28 is made adjustable in length by means of a three-pronged slide buckle 66 through which the fixed end of the strap 58 is passed, and after passing through the interlocking oval ring 62, is doubled back through the aforementioned buckle 66.

Still referring to FIG. 2, the belt clip 30 is seen in position slightly below the bend at the midpoint 36 of the member 18. The belt clip 30 is essentially a flat piece of metal held a fixed distance away from the member 18 so a space is provided to allow a person's belt to be held between the belt clip 30 and the member 18. The outside edges 68 along the width of the belt clip 30 overlap slightly on the member 18 so that the belt clip 30 does not rotate. A bolt 70, the head of which (not shown) is recessed in the belt clip 30 to prevent it from snagging the photographer's clothing, along with a wing nut 72, hold the belt clip 30 to the member 18. A projection 74 extends from the interior of the belt clip 30 as shown in FIG. 3 to provide additional stability by preventing the belt clip 30 from rotating about the bolt 70. By loosening the wing nut 72, the person using the camera stabilizing device 10 of the present invention may move the belt clip up and down in the slot 44.

On the bottom end 34 of the member 18, a curved piece of metal, the thigh support 26, for supporting the member 18 on the thigh of the photographer is fastened. When the device 10 is in use, with the lower half of the member 18 adjacent to the body of the photographer 12, as seen in FIG. 1, the thigh support 26 engages the thigh 20 of the photographer at approximately one-fourth of the way down from the photographer's belt 32 to the photographer's knee. The overall shape of the thigh support 26, as seen in FIGS. 1 and 4, approximates a half circle. The thigh support 26 may be welded to the lower end 34 of the member 18.

To use the camera stabilizing device 10, the photographer must first, loosen the wing nut 72 and adjust the belt clip 30 to the position along the member 18, which when the photographer's arm 14 is placed in the armrest 24, will bring the view finder of the camera 16 up to eyelevel. The photographer 12 should then clip the device 10 onto his belt 32 at a position over his thigh 20, and pass the loose end 60 of the strap 28 under the arm 14 he will use to hold the camera, around his back, over his opposite shoulder, and attach the snap hook 64 to the oval ring 56. Finally, the photographer should adjust the length of the strap 28 by means of the three-prong slide buckle 66 so the armrest 24 is the proper distance away to hold his elbow 22.

The arm 14 of the photographer may thus be held in a position to support videotape or other camera 16 at eye level for the extended period of time often necessary to photograph certain events, such as football and soccer games which may last several hours. The photographer can adjust his or her field of vision over a wide angle by simply turning his or her entire body to the left or right. In addition, the photographer can make small adjustments in the field of vision by means of the armrest 24, which is made adjustable for turning about the platform 42 of the member 18 by virtue of being connected by a bolt and hex nut, which at the same time is not able to move loosely around the platform 42 because of the star washer underneath the hex nut 54. If the sporting or other event being photographed suddenly comes near the photographer, the photographer may, to prevent possible injury to himself or to his equipment, simply raise or lower the camera by moving his forearm, or may even lift his entire arm out of the armrest 24 and bring the camera to his side, which is generally impossible with a shoulder harness type camera stabilizing device.

It is to be understood that the form of the invention shown in the accompanying drawings and described in this specification is the preferred example of the same, and this invention is not limited to the exact arrangement of parts shown or described, and various changes in the details of construction as to size, shape, and arrangement of parts may be made without departing from the spirit of the invention, the scope of the novel concepts of the invention, or the scope of the following claims.

Having thus described the invention, what is claimed is:

1. A camera stabilizing device for steadying a hand-held camera, which comprises:

a member for supporting the arm of the person holding the camera which extends from the arm of the person at its upper end, through a point adjacent the person's midsection where it is retained at the person's waist, downward to the person's thigh at its lower end where it engages the thigh to support and stabilize the person's arm so the viewfinder of the camera is kept at eye level when the person wears the device, wherein the member is bent approximately in the middle so that the lower half of the member is nearly vertical and adjacent to the person's body, and the upper half of the member extends outward from the body of the person at an angle to support the person's elbow;

an arm rest attached to the upper end of the member for maintaining the elbow of the person holding the camera in position on top of the member;

a means for engaging the belt of the person using the device attached to the member at the point the member is adjacent the person's midsection for restricting lateral movement of the device;

a thigh support attached to the lower end of the member for stabilizing the device on the person's thigh; and, a strap connected to the member which passes around the body of the person wearing the device to hold the device in place.

2. The device of claim 1 wherein the means for engaging the belt of the person using the device is a belt clip mounted on the member, and the lower half of the member has a vertical slot down the center to allow the belt clip to be adjusted vertically on the member so the device can be worn by persons of various heights and sizes.

3. The device of claim 2, wherein the strap which passes around the body of the person wearing the device is adjustable.

* * * * *